(12) United States Patent
Nishi et al.

(10) Patent No.: US 7,932,939 B2
(45) Date of Patent: Apr. 26, 2011

(54) APPARATUS AND METHOD FOR CORRECTING BLURRED IMAGES

(75) Inventors: Toru Nishi, Kanagawa (JP); Kazuhiko Ueda, Kanagawa (JP); Mitsuyasu Asano, Tokyo (JP); Takeshi Hiramatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 344 days.

(21) Appl. No.: 11/782,880

(22) Filed: Jul. 25, 2007

(65) Prior Publication Data
US 2008/0143839 A1    Jun. 19, 2008

(30) Foreign Application Priority Data
Jul. 28, 2006  (JP) ................. 2006-205701

(51) Int. Cl.
*H04N 5/208* (2006.01)
*H04N 5/202* (2006.01)
(52) U.S. Cl. ............. 348/252; 348/254
(58) Field of Classification Search .......... 348/208.6, 348/252, 253, 606, 625, 254; 382/255
See application file for complete search history.

(56) References Cited

U.S. PATENT DOCUMENTS

| | | | | |
|---|---|---|---|---|
| 5,036,405 | A * | 7/1991 | Kojima | 358/448 |
| 5,617,116 | A * | 4/1997 | Edgar | 345/440.2 |
| 2002/0139857 | A1 * | 10/2002 | Ishii et al. | 235/462.25 |
| 2002/0141005 | A1 * | 10/2002 | Okisu et al. | 358/540 |
| 2003/0011717 | A1 * | 1/2003 | McConica | 348/699 |
| 2003/0090742 | A1 * | 5/2003 | Fukuda et al. | 358/448 |
| 2003/0185458 | A1 * | 10/2003 | Wang | 382/255 |
| 2004/0070778 | A1 | 4/2004 | Matama | |
| 2005/0232356 | A1 * | 10/2005 | Gomi et al. | 348/699 |
| 2006/0092164 | A1 * | 5/2006 | Takeuchi et al. | 345/530 |
| 2008/0002901 | A1 * | 1/2008 | Miyagi et al. | 382/260 |
| 2008/0007785 | A1 * | 1/2008 | Hashii et al. | 358/1.2 |
| 2008/0095400 | A1 | 4/2008 | Nagano et al. | |

FOREIGN PATENT DOCUMENTS

| | | |
|---|---|---|
| EP | 1 667 065 A1 | 6/2006 |
| JP | 2005-286411 | 10/2005 |
| WO | WO 2006/068292 A1 | 6/2006 |

OTHER PUBLICATIONS

J. Astola, et al., "Fundamentals of nonlinear filtering", 1 page (1997) XP002603942.
Yong Hoon Lee et al., "An Edge Gradient Enhancing Adaptive Order Statistic Filter", IEEE Transactions on Acoustics, Speech, and Signal Processing, vol. 35, No. 5, pp. 680-695 (1987) XP000003667.
Partial European Search Report issued Nov. 11, 2010, in Berlin, in EP 07 25 2603.

* cited by examiner

*Primary Examiner* — Jason Whipkey
(74) *Attorney, Agent, or Firm* — Finnegan, Henderson, Farabow, Garrett & Dunner, L.L.P.

(57) ABSTRACT

In an image processing apparatus that performs image processing on an image supplied from an imaging apparatus that captured an original image and that performed gamma processing on the original image to generate the image to be supplied to the image processing apparatus, inverse gamma processing means performs inverse gamma processing on the image supplied from the imaging apparatus so that the image has characteristics the same as characteristics of the original image, which corresponds to the image before the image was subjected to the gamma processing in the imaging apparatus, and correction processing means performs correction processing on the image subjected to the inverse gamma processing using the inverse gamma processing means so that blur in the image is corrected.

14 Claims, 11 Drawing Sheets

PRIOR ART

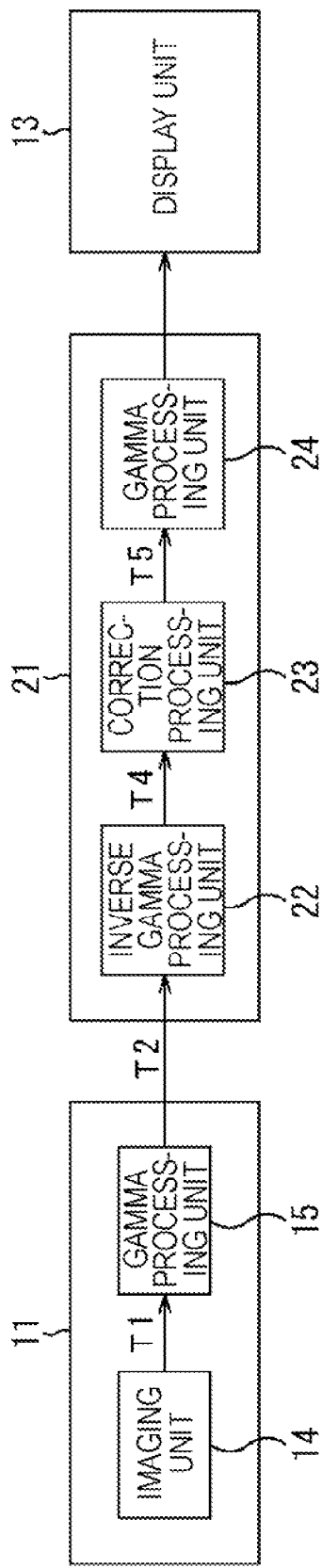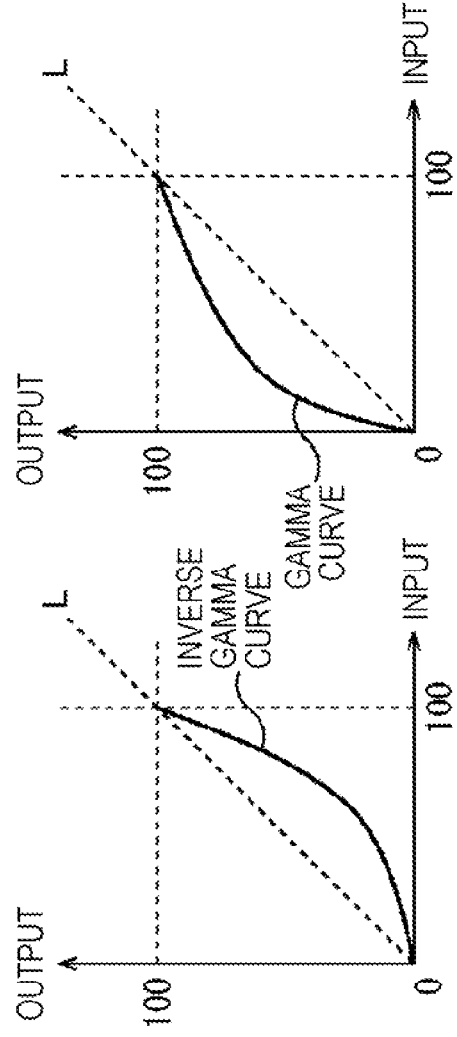

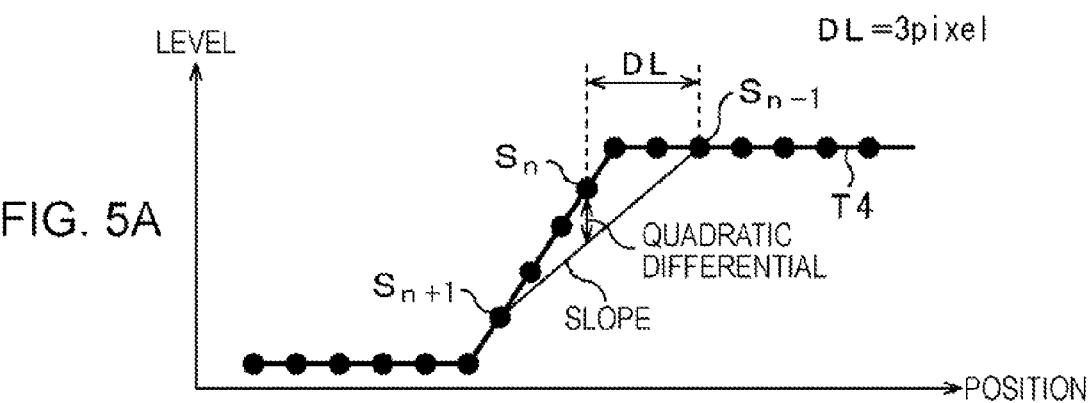
FIG. 5A
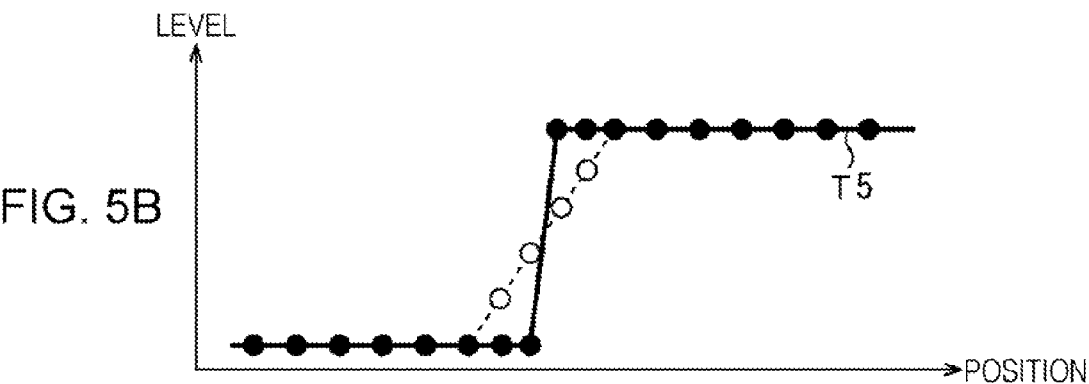
FIG. 5B

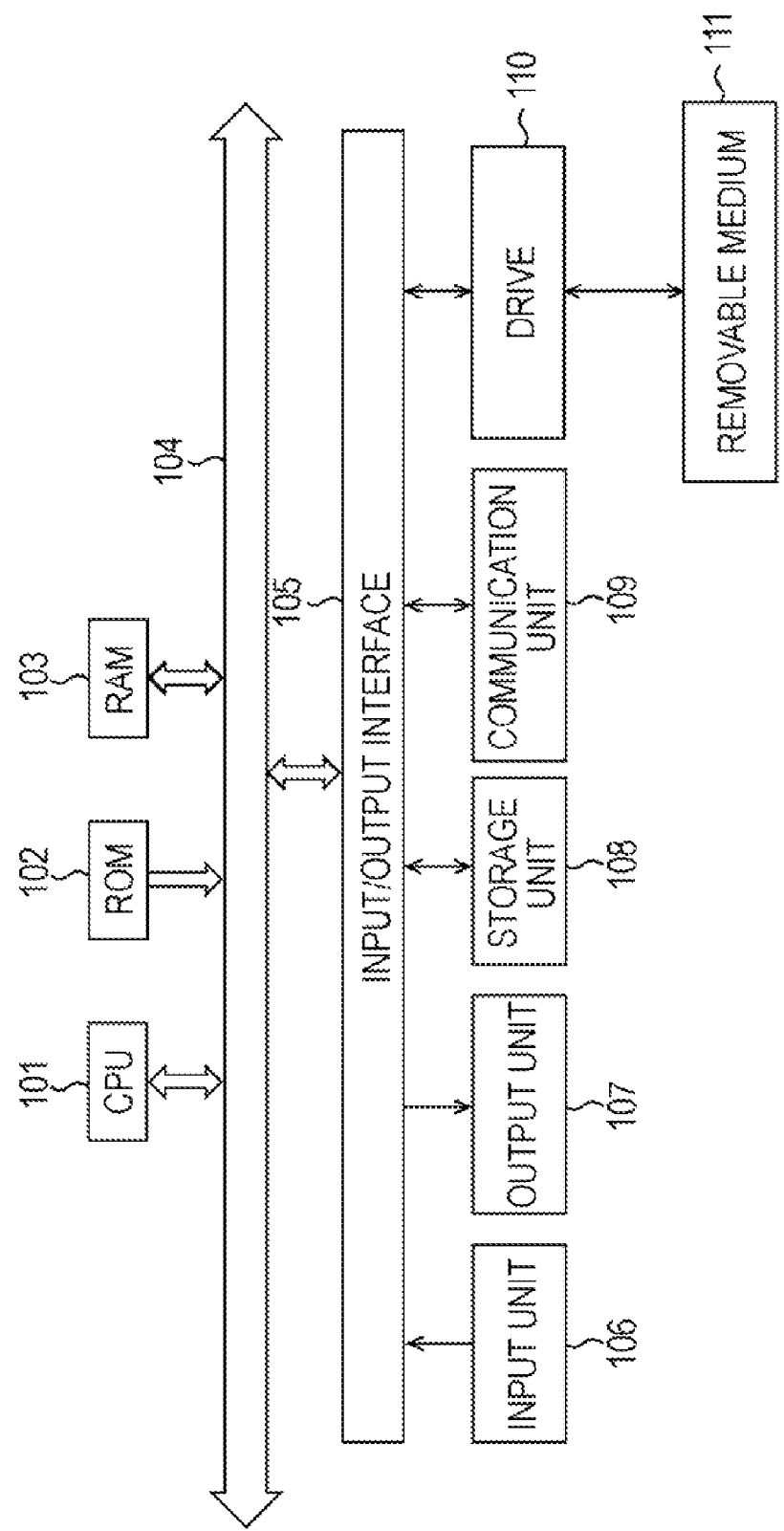

APPARATUS AND METHOD FOR CORRECTING BLURRED IMAGES

CROSS REFERENCES TO RELATED APPLICATIONS

The present invention contains subject matter related to Japanese Patent Application JP 2006-205701 filed in the Japanese Patent Office on Jul. 23, 2006, the entire contents of which are incorporated herein by reference.

BACKGROUND OF THE INVENTION

1. Field of the Invention

The present invention relates to image processing apparatuses, image processing methods, and programs. More particularly, the present invention relates to an image processing apparatus, an image processing method, and a program, which are capable of correcting blur in an image while an area of a bright region in the image is maintained.

2. Description of the Related Art

In general, in a case where an image of a subject is captured using a camera, when the subject moves with respect to the camera or the camera is moved with respect to the subject, an image including motion blur may be captured. Accordingly, the image including motion blur is supplied from the camera to a display unit to be displayed.

To address this problem, a known image processing apparatus performs image processing on a blurred image supplied from a camera so as to suppress motion blur of the image. In such an image processing apparatus, a relative amount of motion between the camera and the subject is calculated in accordance with motion blur of an image. The amount of motion is used to estimate the motion blur at a time of imaging, and image processing is performed to suppress motion blur of an image to be displayed.

In an image including motion blur, for example, pixel values at edge portions of the image gradually change. The image processing apparatus is used to correct the pixel values at the edge portions, which gradually change, so that the pixel values at the edge portions markedly change.

In general, a display unit, such as a CRT (Cathode Ray Tube), of a television set for displaying an image has a characteristic (a gamma characteristic) in which brightness of a screen is not linearly proportional to a level of the image but is changed on an exponentially proportional basis. For example, a camera used in a television station performs gamma processing on an image obtained as a result of imaging so that a gamma characteristic of a display unit is corrected, and an image which is subjected to the gamma processing is output. For example, according to ITU-R BT601, ITU-R BT709, or sRGB (standard RGB), a gamma value used in gamma processing is set so as no substantially satisfy $\gamma=1/2.2$, provided that the CRT is a standard display apparatus.

However, there arises a problem in that when the image processing apparatus performs image processing to suppress motion blur on an image which was subjected to gamma processing in a camera, edge portions of the image are displaced.

Referring to FIGS. 1A and 1B and 2A to 2D, an image obtained after an image is subjected to gamma processing in a camera and then the image is subjected to image processing for suppressing motion blur will be described.

FIG. 1A is a block diagram illustrating a system including a camera 11, an image processing apparatus 12, and a display unit 13.

The camera 11 includes an imaging unit 14 and a gamma processing unit 15.

The imaging unit 14 captures an image of a subject, not shown, and supplies an obtained image T1 to the gamma processing unit 15.

The gamma processing unit 15 performs gamma processing on the image T1 supplied from the imaging unit 14, and supplies an image T2 obtained as a result of the gamma processing to the image processing apparatus 12. That is, the gamma processing unit 15 corrects pixel values of the image T1 supplied from the imaging unit 14 in accordance with a gamma curve shown in FIG. 1B, and supplies the image T2 including the corrected pixel values to the image processing apparatus 12.

The image processing apparatus 12 performs image processing for suppressing motion blur on the image T2 supplied from the gamma processing unit 15 of the camera 11. Furthermore, the image processing apparatus 12 supplies an image T3 obtained as a result of the image processing to the display unit 13.

The display unit 13 displays the image T3 which was subjected to the image processing performed using the image processing apparatus 12.

FIGS. 2A and 2B are graphs used for explaining an image T0 and the image T1, respectively, which are captured using the imaging unit 14. FIG. 2C is a graph used for explaining the image T2 subjected to gamma processing using the gamma processing unit 15. FIG. 2D is a graph used for explaining the image T3 subjected to image processing using the image processing apparatus 12.

In each of the graphs of FIGS. 2A to 2D, an axis of abscissa represents a position (a pixel position) in a first direction of the corresponding one of the images, and an axis of ordinate represents a pixel value (a luminance level) of the corresponding one of the images.

For example, when the camera 11 captures a scene including a white subject on a black background, an image obtained as a result of the capturing includes a black portion having a pixel value of 0 (substantially 0) corresponding to the black background, an edge portion having a pixel value varying from 0 to 100, and a white portion having a pixel value of 100 (substantially 100) corresponding to the white subject. FIGS. 2A to 2D illustrate portions around edge portions of the image obtained by capturing the scene including the white subject on the black background.

FIG. 2A is used to illustrate the image T0 captured using the imaging unit 14 when the subject and the camera 11 stay still.

The image T0 includes a black portion having a pixel value of 0 on the left side relative to a position A, an edge portion having a pixel value represented by a line steeply changing from 0 to 100 at the position A, and a white portion having a pixel value of 100 on the right side relative to the position A. Accordingly, when the subject and the camera 11 stay still, the image T0 including the edge portion having the pixel value represented by a steeply changing line (in a vertical direction with respect to the black portion and the white portion) is captured, that is, the image T0 without motion blur is captured.

FIG. 2B is used to illustrate the image T1 captured using the imaging unit 14 when the subject and the camera 11 are moved relative to each other.

The image T1 includes a black portion having a pixel value of 0 on the left side relative to a position B, an edge portion having a pixel value represented by a line gradually changing from 0 to 100 from the position B to a position A, and a white portion having a pixel value of 100 on the right side relative to the position A. A position C is a center position of the edge portion of the image T1.

As can be seen from the figure, when the subject and the camera 11 are moved relative to each other, the image T1 including the edge portion having the pixel value represented by a gradually changing line is captured, that is, the image T1 including motion blur is captured.

FIG. 2C is used to illustrate the image T2 obtained by performing gamma processing on the image T1 including motion blur using the gamma processing unit 15.

The image T2 includes a black portion having a pixel value of 0 on the left side relative to the position B, an edge portion subjected to gamma processing, located between the position B to the position A, and a white portion having a pixel value of 100 on the right side relative to the position A. That is, the image T2 has pixel values obtained by correcting the pixel value of the image T1 including motion blur in accordance with the gamma curve shown in FIG. 1. In the image T2, the curve representing the pixel value of the edge portion changes so as to markedly rise in the vicinity of the position B. As described above, the image T1 including motion blur is subjected to the gamma processing using the gamma processing unit 15, whereby the image T2 including the edge portion having the curve representing the pixel value which changes so as to markedly rise in the vicinity of the position B is obtained.

FIG. 2D is used to illustrate the image T3 which is obtained by performing image processing on the image T2, which was subjected to the gamma processing, using the image processing apparatus 12.

The image T3 includes a black portion having a pixel value of 0 on the left side relative to the position B, an edge portion for which a line representing a pixel value more steeply changes than that representing the pixel value of the edge portion of the image T1 and which is located between the position B and a position D which is located on the left side relative to the position A, and a white portion having a pixel value of 100 on the right side relative to the position D. Note that a position C' is a center position of the edge portion of the image T3.

As described above, the image T2 which was subjected to the gamma processing is further subjected to image processing using the image processing apparatus 12, whereby the image T3 having the edge portion for which the curve representing the pixel value more steeply changes than that representing the pixel value of the edge portion of the image T1 is obtained, that is, the image T3 in which motion blur included therein is suppressed when compared with the motion blur included in the image T1.

However, in the image T3, the position C' which is a center position of the edge portion of the image T3 is displaced to the left from the position C which is a center position of the edge portion of the image T1 captured using the imaging unit 14. Specifically, the center position of the edge portion of the image T3, which was subjected to the image processing using the image processing apparatus 12, is displaced with respect to the center of the edge portion of the image T2, which was subjected to the gamma processing.

When the edge portion is displaced as described above, the white portion becomes wider, and accordingly, a bright region of the captured subject becomes wider, resulting in deterioration of a displayed image.

To address this disadvantage, Japanese Unexamined Patent Application Publication No. 2005-286411, for example, discloses an image processing apparatus which processes a luminance signal and a color signal of an image so that contours in the image are emphasized, and which selects one of an image in which a luminance signal thereof was processed and an image in which a color signal thereof was processed in accordance with the relationship in hue between the subject and the background.

SUMMARY OF THE INVENTION

As described above, when the image processing is performed for suppressing motion blur in the image which was subjected to the gamma processing, the edge portion of the image may be displaced. Accordingly, a bright region may become wider resulting in deterioration of a displayed image.

Accordingly, it is desirable to correct a blurred image while an area of bright region of the image is retained, and furthermore, details of the image are retained.

According to an embodiment of the present invention, there is provided an image processing apparatus that performs image processing on an image supplied from an imaging apparatus that captured an original image and that performed gamma processing on the original image to generate the image to be supplied to the image processing apparatus, the image processing apparatus including: inverse gamma processing means for performing inverse gamma processing on the image supplied from the imaging apparatus so that the image has characteristics the same as characteristics of the original image, which corresponds to the image before the image was subjected to the gamma processing in the imaging apparatus; and correction processing means for performing correction processing on the image subjected to the inverse gamma processing using the inverse gamma processing means so that blur in the image is corrected.

According to another embodiment of the present invention, there is provided an image processing method for performing image processing on an image supplied from an imaging apparatus that captured an original image and that performed gamma processing on the original image to generate the image to be supplied, or a program executed by a computer that performs the image processing, the image processing method or the program including the steps of: performing inverse gamma processing on the image supplied from the imaging apparatus so that the image has characteristics the same as characteristics of the original image, which corresponds to the image before the image was subjected to the gamma processing in the imaging apparatus; and performing correction processing on the image subjected to the inverse gamma processing so that blur in the image is corrected.

Accordingly, the image supplied from the imaging apparatus is subjected to the inverse gamma processing so that the image has characteristics the same as characteristics of the original image, which corresponds to the image before the image was subjected to the gamma processing in the imaging apparatus. In addition, the image subjected to the inverse gamma processing is further subjected to correction processing so that blur in the image is corrected.

According to a further embodiment of the present invention, there is provided an image processing apparatus that performs image processing on an image supplied from an imaging apparatus that captured an original image and that performed gamma processing on the original image to generate the image to be supplied to the image processing apparatus, the image processing apparatus including: processing means for performing predetermined processing on the image supplied from the imaging apparatus; calculating means for performing predetermined calculation using, among pixels constituting the image subjected to the predetermined processing using the processing means, a pixel value of a pixel of interest which is an object to be subjected to processing, a pixel value of a pixel spaced away from the pixel of interest in a first direction, and a pixel value of a pixel spaced away from the pixel of interest in a second direction; and replacing means for replacing the pixel value of the pixel, which corresponds to the pixel of interest, supplied from the imaging apparatus with any one of the pixel value of the pixel spaced away from the pixel of interest in the first direction and the pixel value of the pixel spaced away from the pixel of interest in the second direction in accordance with a result of the calculation performed using the calculating means.

According to a still further embodiment of the present invention, there is provided an image processing method for performing image processing on an image supplied from an imaging apparatus that captured an original image and that performed gamma processing on the original image to generate the image to be supplied, or a program executed by a computer that performs the image processing, the image processing method or the program including the steps of: performing predetermined processing on the image supplied from the imaging apparatus; performing predetermined calculation using, among pixels constituting the image subjected to the predetermined processing, a pixel value of a pixel of interest which is an object to be subjected to processing, a pixel value of a pixel spaced away from the pixel of interest in a first direction, and a pixel value of a pixel spaced away from the pixel of interest in a second direction; and replacing the pixel value of the pixel, which corresponds to the pixel of interest, supplied from the imaging apparatus with any one of the pixel value of the pixel spaced away from the pixel or interest in the first direction and the pixel value of the pixel spaced away from the pixel of interest in the second direction in accordance with a result of the calculation.

Accordingly, the image supplied from the imaging apparatus is subjected to the predetermined processing, and the predetermined calculation is performed using, among pixels constituting the image subjected to the predetermined processing, a pixel value of a pixel of interest which is an object to be subjected to processing, a pixel value of a pixel spaced away from the pixel of interest in a first direction, and a pixel value of a pixel spaced away from the pixel of interest in a second direction. In addition, the pixel value of the pixel, which corresponds to the pixel of interest, supplied from the imaging apparatus is replaced by any one of the pixel value of the pixel spaced away from the pixel of interest in the first direction and the pixel value of the pixel spaced away from the pixel of interest in the second direction in accordance with a result of the calculation performed using the calculating means.

Accordingly, blur in an image is corrected while an area of a bright region in the image is maintained.

BRIEF DESCRIPTION OF THE DRAWINGS

FIG. 3A is a block diagram illustrating a configuration of an image processing apparatus according to a first embodiment of the present invention;

FIGS. 3B and 3C are graphs used to illustrate processing of the image processing apparatus according to the first embodiment of the present invention;

FIGS. 5A and 5B are graphs used to illustrate correction processing performed on an image supplied to a correction processing unit;

FIG. 11 is a block diagram illustrating a configuration of a computer that performs a series of processes by executing programs.

DESCRIPTION OF THE PREFERRED EMBODIMENTS

Figure 1A:
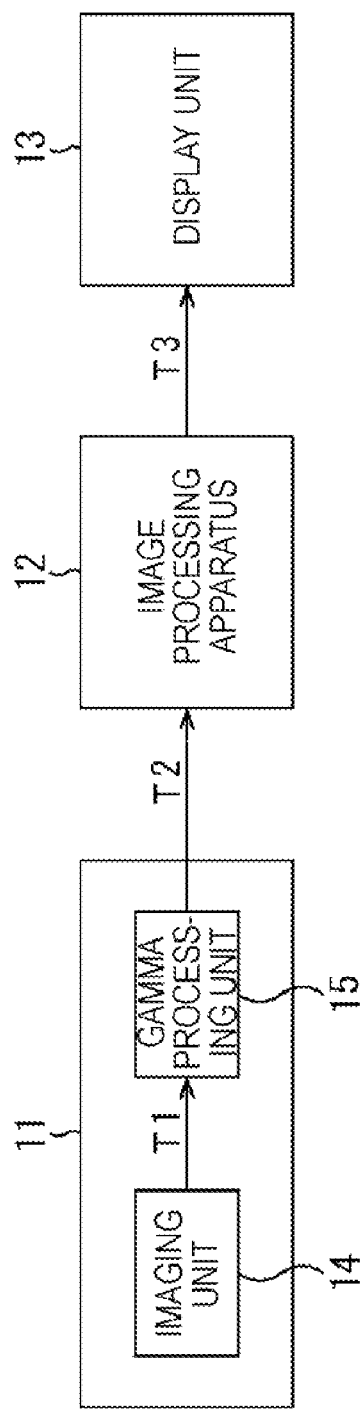
FIG. 1A is a block diagram illustrating an image processing apparatus in the related art.

Before describing embodiments of the present invention, the correspondence between the features of the claims and the specific elements disclosed in embodiments and drawings of the present invention is discussed below. This description is intended to assure that embodiments supporting the claimed invention are described in this specification. Thus, even if an element in the following embodiments is not described as relating to certain features of the present invention, that does not necessarily mean that the element does not relate to that feature of the claims. Conversely, even if an element is described herein as relating to a certain feature of the claims, that does not necessarily mean that the element does not relate to other features of the claims.

According to an embodiment of the present invention, there is provided an image processing apparatus that performs image processing on an image supplied from an imaging apparatus that captured an original image and that performed gamma processing on the original image to generate the image to be supplied to the image processing apparatus, the image processing apparatus including: inverse gamma processing means (for example, an inverse gamma processing unit 22 shown in FIG. 3) for performing inverse gamma processing on the image supplied from the imaging apparatus so that the image has characteristics the same as characteristics of the original image, which corresponds to the image before the image was subjected to the gamma processing in the imaging apparatus; and correction processing means (for example, a correction processing unit 23 shown in FIG. 3) for performing correction processing on the image subjected to the inverse gamma processing using the inverse gamma processing means so that blur in the image is corrected.

According to the embodiment of the present invention, the image processing apparatus further may include: gamma processing means (for example, a gamma processing unit 24 shown in FIG. 3) for performing gamma processing, which is the same as the gamma processing performed in the imaging apparatus, on the image subjected to the correction processing using the correction processing means.

According to the embodiment of the present invention, the correction processing means may include: calculating means (for example, a calculation unit 32 shown in FIG. 6) for performing predetermined calculation using, among pixels constituting the image subjected to the inverse gamma processing using the inverse gamma processing means, a pixel value of a pixel of interest which is an object to be subjected to the correction processing, a pixel value of a pixel spaced away from the pixel of interest in a first direction, and a pixel value of a pixel spaced away from the pixel of interest in a second direction; and replacing means (for example, a replacement unit 33 shown in FIG. 6) for replacing the pixel value of the pixel of interest with any one of the pixel value of the pixel spaced away from the pixel of interest in the first direction and the pixel value of the pixel spaced away from the pixel of interest in the second direction in accordance with a result of the calculation performed using the calculating means.

Figure 7:
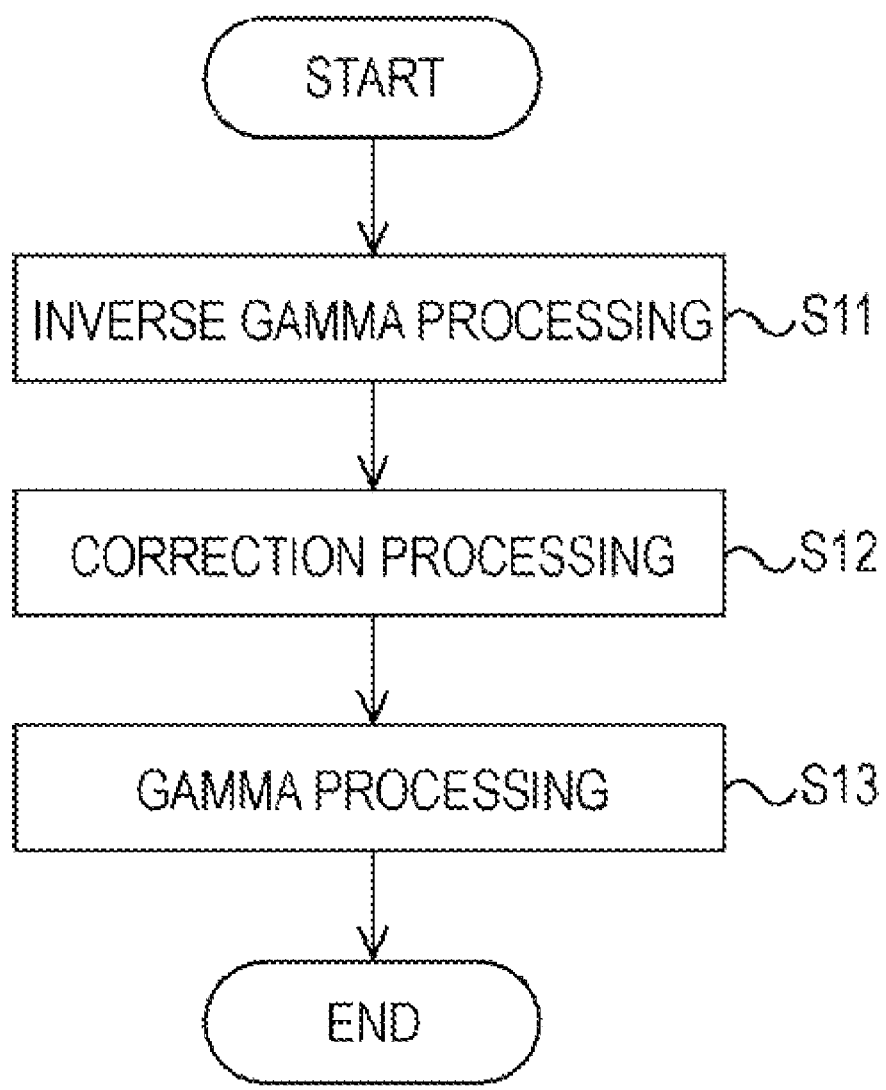
FIG. 7 is a flowchart illustrating the image processing performed using the image processing apparatus according to a first embodiment.

According to another embodiment of the present invention, there is provided an image processing method for performing image processing on an image supplied from an imaging apparatus that captured an original image and that performed gamma processing on the original image to generate the image to be supplied, or a program executed by a computer that performs the image processing, the image processing method or the program including the steps of: performing inverse gamma processing on the image supplied from the imaging apparatus so that the image has characteristics the same as characteristics of the original image, which corresponds to the image before the image was subjected to the gamma processing in the imaging apparatus, (for example, step S11 shown in FIG. 7); and performing correction processing on the image subjected to the inverse gamma processing so that blur in the image is corrected (for example, step S12 shown in FIG. 7).

According to a further embodiment of the present invention, there is provided an image processing apparatus that performs image processing on an image supplied from an imaging apparatus that captured an original image and that performed gamma processing on the original image to generate the image to be supplied to the image processing apparatus, the image processing apparatus including: processing means (for example, an inverse gamma processing unit 22 shown in FIG. 8) for performing predetermined processing on the image supplied from the imaging apparatus; calculating means (for example, a calculation unit 32 shown in FIG. 8) for performing predetermined calculation using, among pixels constituting the image subjected to the predetermined processing using the processing means, a pixel value of a pixel of interest which is an object to be subjected to processing, a pixel value of a pixel spaced away from the pixel of interest in a first direction, and a pixel value of a pixel spaced away from the pixel of interest in a second direction; and replacing means (for example, a replacement unit 33 shown in FIG. 8) for replacing the pixel value of the pixel, which corresponds to the pixel of interest, supplied from the imaging apparatus with any one of the pixel value of the pixel spaced away from the pixel of interest in the first direction and the pixel value of the pixel spaced away from the pixel of interest in the second direction in accordance with a result of the calculation performed using the calculating means.

Figure 9:
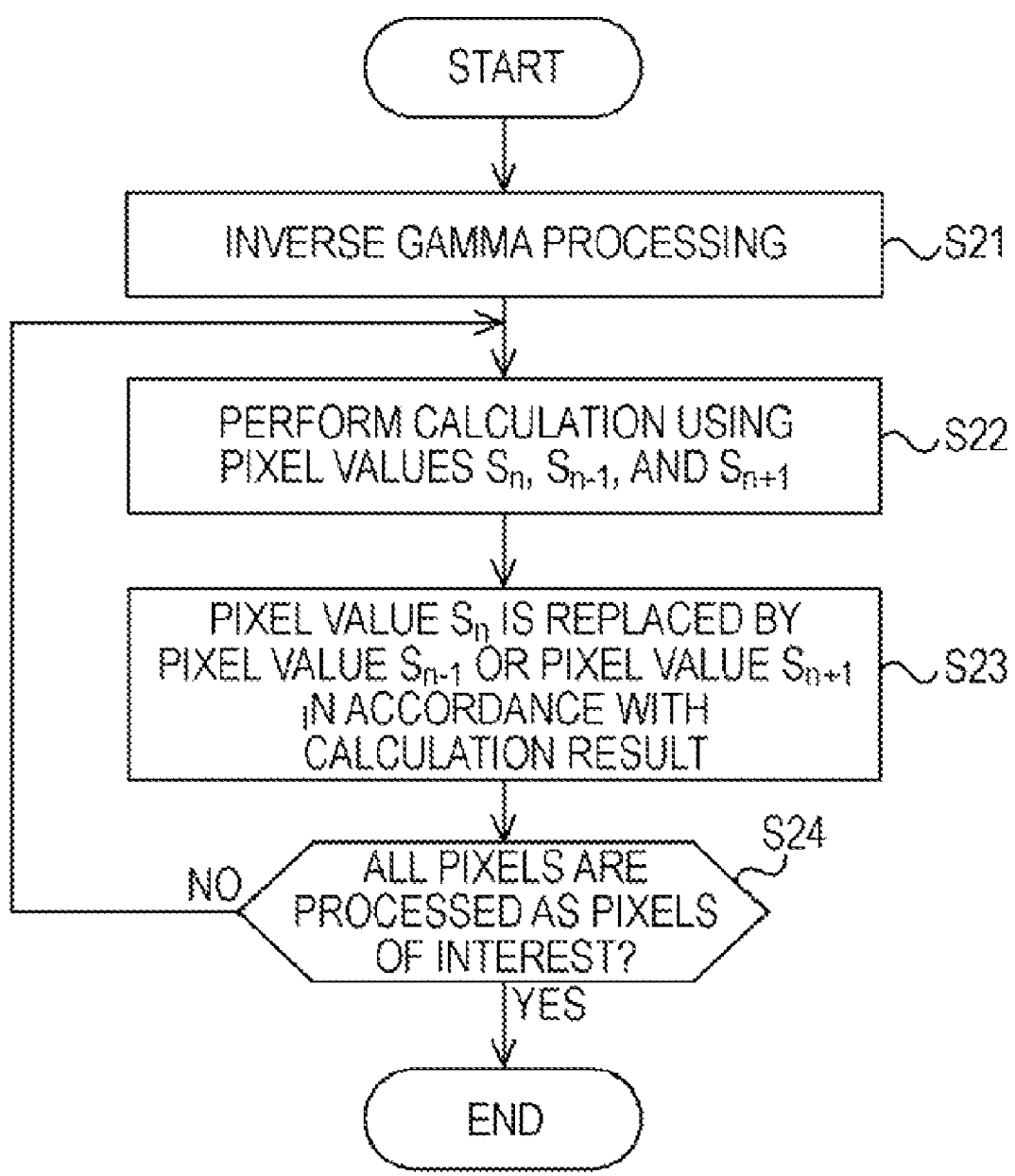
FIG. 9 is a flowchart illustrating image processing performed using the image processing apparatus according to the second embodiment.

According to a still further embodiment of the present invention there is provided an image processing method for performing image processing on an image supplied from an imaging apparatus that captured an original image and that performed gamma processing on the original image to generate the image to be supplied, or a program executed by a computer that performs the image processing method or the program including the steps of: performing predetermined processing on the image supplied from the imaging apparatus (for example, step S21 shown in FIG. 9); performing predetermined calculation using, among pixels constituting the image subjected to the predetermined processing, a pixel value of a pixel of interest which is an object to be subjected to processing, a pixel value of a pixel spaced away from the pixel of interest in a first direction, and a pixel value of a pixel spaced away from the pixel of interest in a second direction (for example, step S22 shown in FIG. 9); and replacing the pixel value of the pixel, which corresponds to the pixel of interest, supplied from the imaging apparatus with any one of the pixel value of the pixel spaced away from the pixel of interest in the first direction and the pixel value of the pixel spaced away from the pixel of interest in the second direction in accordance with a result of the calculation (for example, step S23 shown in FIG. 9).

Embodiments of the present invention will be described in detail hereinafter with reference to the accompanying drawings.

FIG. 3A is a block diagram illustrating a configuration of an image processing apparatus 21 according to a first embodiment of the present invention.

In FIG. 3A, the image processing apparatus 21 includes an inverse gamma processing unit 22, a correction processing unit 23, and a gamma processing unit 24.

An image T1 captured using an imaging unit 14 of a camera 11 is subjected to gamma processing using a gamma processing unit 15 so that an image T2 is obtained. Thereafter, the image T2 is supplied to the inverse gamma processing unit 22. The inverse gamma processing unit 22 performs inverse gamma processing on the image T2 supplied from the gamma processing unit 15 so that the image T2 has characteristics the same as those of the image T1, which is the same as the original image before it was subjected to the gamma processing using the gamma processing unit 15, to obtain an image T4. The image T4 is supplied to the correction processing unit 23.

Figure 1B:
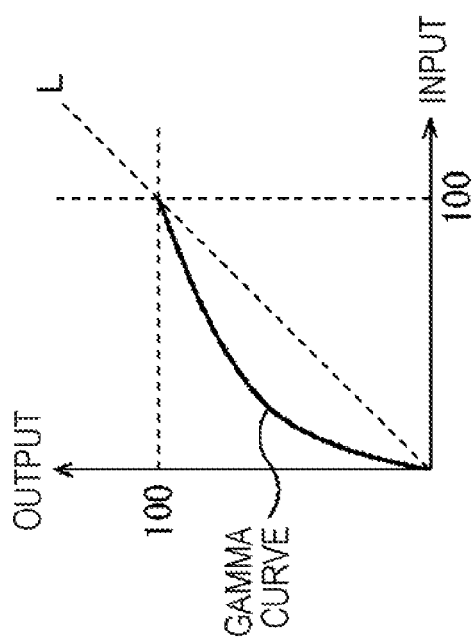
FIG. 1B is a graph used to illustrate processing of the image processing apparatus in the related art.

For example, the inverse gamma processing unit 22 corrects a pixel value of the image T2, which is supplied from the gamma processing unit 15, in accordance with an inverse gamma curve shown in FIG. 3B (that is, a curve having an inverse characteristic with respect to the gamma curve shown in FIG. 1B).

The correction processing unit 23 performs correction processing on the image T4, which was subjected to the inverse gamma processing using the inverse gamma processing unit 22, so that the image T4 including blur is corrected to obtain an image T5. The image T5 is supplied to the gamma processing unit 24. For example, the correction processing unit 23 performs correction processing for correcting a pixel value of an edge portion of the image T4 so that the curve representing the pixel value markedly changes.

The gamma processing unit 24 performs gamma processing, which is the same as that performed using the gamma processing unit 15, on the image T5, which was subjected to the correction processing using the correction processing unit 23, and thereafter, the processed image is supplied to a display unit 13. For example, the gamma processing unit 24 corrects a pixel value of the image T5, which is supplied from the correction processing unit 23, in accordance with a gamma curve shown in FIG. 3C (that is, the same gamma curve as that shown in FIG. 1B).

Figure 4A:
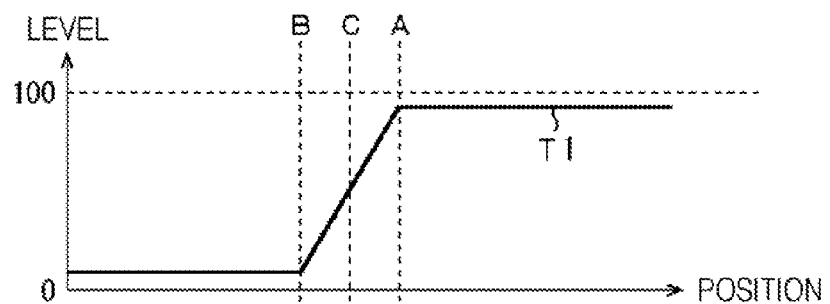
FIGS. 4A to 4D are graphs used to illustrate images obtained in processing steps in image processing.
Figure 4B:
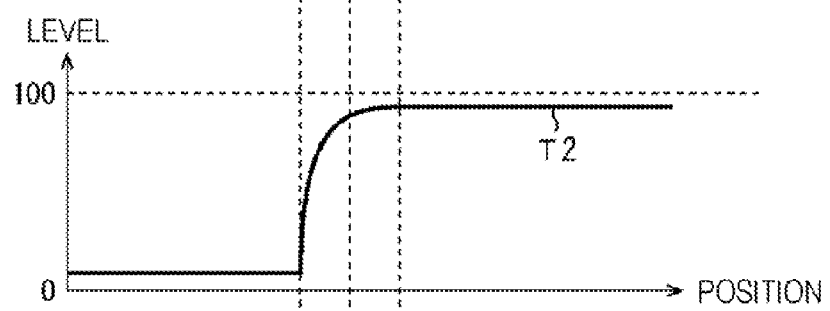
Figure 4C:
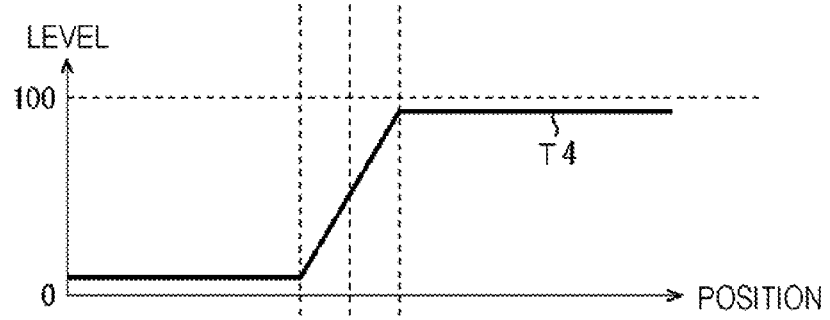
Figure 4D:
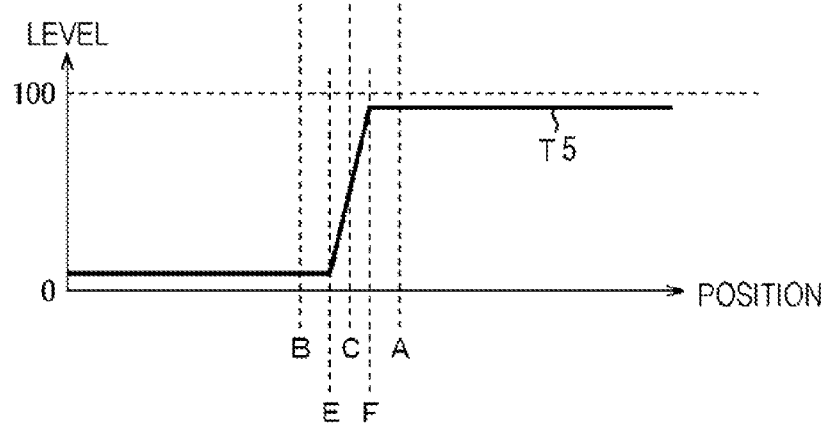

FIG. 4A is used to illustrate the image T1 which is captured using the imaging unit 14. FIG. 4B is used to illustrate the image T2 which has been subjected to the gamma processing using the gamma processing unit 15. FIG. 4C is used to illustrate the image T4 which has been subjected to the inverse gamma processing using the inverse gamma processing unit 22. FIG. 4D is used to illustrate the image T5 which has been subjected to the correction processing using the correction processing unit 23.

In each of FIGS. 4A to 4D, as with each of FIGS. 2A to 2D, an axis of abscissa represents a position (a pixel position) in a first direction of the corresponding one of the images, and an axis of ordinate represents a pixel value (a luminance level) of the corresponding one of the images.

Figure 2A:
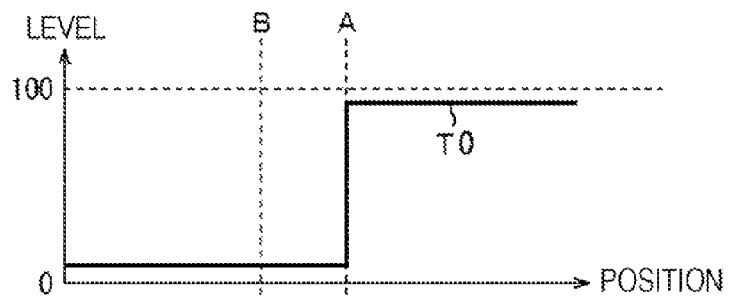
FIGS. 2A to 2D are graphs used to illustrate images obtained using the image processing apparatus in the related art.
Figure 2B:
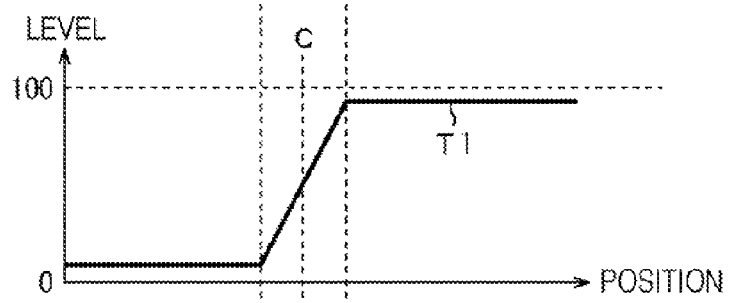

As with the graph shown in FIG. 2B, FIG. 4A is used to illustrate the image T1 including motion blur captured using the imaging unit 14 when the subject and the camera 11 are moved relative to each other. Mote that a position C is a center position of an edge portion of the image T1.

Figure 2C:
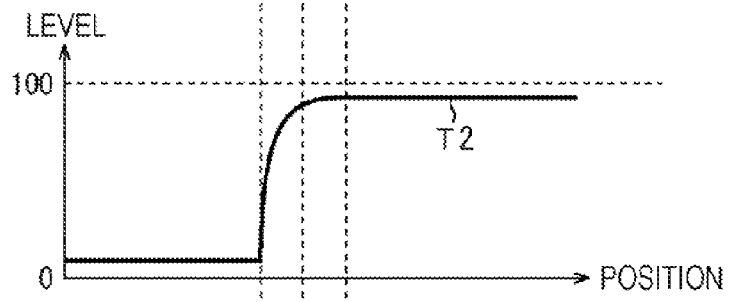
Figure 2D:
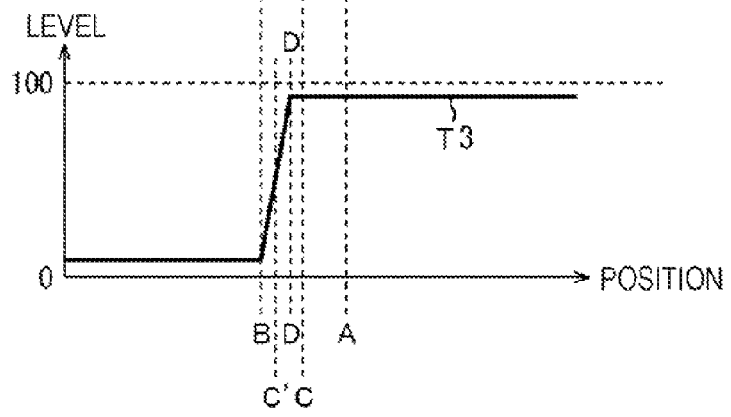

As with the graph shown in FIG. 2C, FIG. 4B is used to illustrate the image T2 which is obtained by performing the gamma processing using the gamma processing unit 15 on the image T1 including motion blur.

FIG. 4C is used to illustrate the image T4 which is obtained by performing the inverse gamma processing using the inverse gamma processing unit 22 on the image T2 which was subjected to the gamma processing.

That is, the image T4 is the same image as the image T1 which is the same as the original image before it was subjected to the gamma processing using the gamma processing unit 15, that is, the same image as the image T1 captured using the imaging unit 14. The image T4 includes a black portion having a pixel value of 0 on the left side relative to a position B, an edge portion for which a line representing a pixel value gradually changes from 0 to 100 from the position B to a position A, and a white portion having a pixel value of 100 on the right side relative to the position A.

FIG. 4D is used to illustrate the image T5 which is obtained by performing the correction processing using the correction processing unit 23 on the image T4 which was subjected to the inverse gamma processing.

The image T5 includes a black portion having a pixel value of 0 on the left side relative to a position E which is located on the right side relative to the position B, an edge portion for which a line representing a pixel value more steeply changes than that representing the pixel value of the edge portion of the image T4 and which is located between the position E and a position F located on the left side relative to the position A, and a white portion having a pixel value of 100 on the right side relative to the position F. Note that a center position of the image T5 coincides with the position C which is the center position of the edge portion of the image T1.

Referring next to FIG. 5, the correction processing performed by the correction processing unit 23 shown in FIG. 3 on the image T4 will be described.

In each of FIGS. 5A and 5B, the axis of abscissa represents a position (a pixel position) in a first direction of the corresponding one of the images, and an axis of ordinate represents a pixel value (a luminance level) of the corresponding one of the images.

FIG. 5A is a graph used to explain the image T4 which is supplied to the correction processing unit 23 from the inverse gamma processing unit 22. FIG. 5B is a graph used to explain the image T5 which has been subjected to the correction processing using the correction processing unit 23. Note that a plurality of points an the graphs shown in FIGS. 4 and 5 represent pixel values of pixels included in the image 74 and the image T5, respectively.

The correction processing unit 23 obtains three pixel values including a pixel value of a pixel of interest which is an object to be subjected to correction processing, a pixel value of a pixel (hereinafter referred to as a "right-pixel" as needed) which is spaced away from the pixel of interest to the right side with a predetermined number of pixels interposed therebetween, and a pixel value of a pixel (hereinafter referred to as a "left pixel" as needed) which is spaced away from the pixel of interest to the left side with a predetermined number of pixels interposed therebetween.

For example, as shown in FIG. 5A, the correction processing unit 23 obtains a pixel value $S_n$ of a pixel of interest as an object to be subjected to correction processing, a pixel value $S_{n-1}$ of a right pixel spaced away from the pixel of interest with two pixels interposed therebetween, and a pixel value $S_{n+1}$ of a left pixel spaced away from the pixel of interest with two pixels interposed therebetween.

Then the correction processing unit 23 calculates equation (1) to obtain a quadratic differential value A at a point representing the pixel value $S_n$ of the pixel of interest on a line connecting a point representing the pixel value $S_n$ of the pixel of interest, a point representing the pixel value $S_{n-1}$ of the right pixel, and a point representing the pixel value $S_{n+1}$ of the left pixel with one another in this order.

$$A = 2 \times S_n - S_{n-1} - S_{n+1} \quad (1)$$

Furthermore, the correction processing unit 23 calculates equation (2) to obtain a value B which represents an amount of difference between the pixel value $S_{n-1}$ of the right pixel and the pixel value $S_{n+1}$ of the left pixel. The difference value B represents a slope of a line in FIG. 5A which connects a point representing the pixel value $S_{n-1}$ of the right pixel and a point representing the pixel value $S_{n+1}$ of the left pixel with each other.

$$B = S_{n-1} - S_{n+1} \quad (2)$$

Thereafter, the correction processing unit 23 determines whether the quadratic differential value A obtained as a result of the calculation of equation (1) is larger than 0 and whether the difference value B obtained as a result of the calculation of equation (2) is larger than 0. In accordance with the determinations, the correction processing unit 23 replaces the pixel value $S_n$ of the pixel of interest with any one of the pixel value $S_{n-1}$ of the right pixel and the pixel value $S_{n+1}$ of the left pixel.

For example, in the relationship between the pixel value $S_n$ of the pixel of interest, the pixel value $S_{n-1}$ of the right pixel, and the pixel value $S_{n+1}$ of the left pixel, a quadratic differential value A is larger than 0 and a difference value B is larger than 0. In such a case where the quadratic differential value A is larger than 0 and the difference value B is larger than 0, the correction processing unit 23 replaces the pixel value $S_n$ of the pixel of interest with the pixel value $S_{n-1}$ of the right pixel.

Note that the correction processing unit 23 replaces the pixel value $S_n$ of the pixel of interest with the pixel value $S_{n-1}$ of the right pixel even when the quadratic differential value A is not larger than 0 and the difference value B is not larger than 0. In addition, the correction processing unit 23 replaces the pixel value $S_n$ of the pixel of interest with the pixel value $S_{n+1}$ of the left pixel, when the quadratic differential value A is larger than 0 and the difference value B is not larger than 0 or when the quadratic differential value A is not larger than 0 and the difference value B is larger than 0.

As described above, the correction processing unit 23 sets every pixel, which constitutes the image T4 illustrated in FIG. 5A, as a pixel of interest, and each of the set pixels of interest is replaced as described above, whereby the image T5 illustrated FIG. 5B is obtained.

Figure 6:
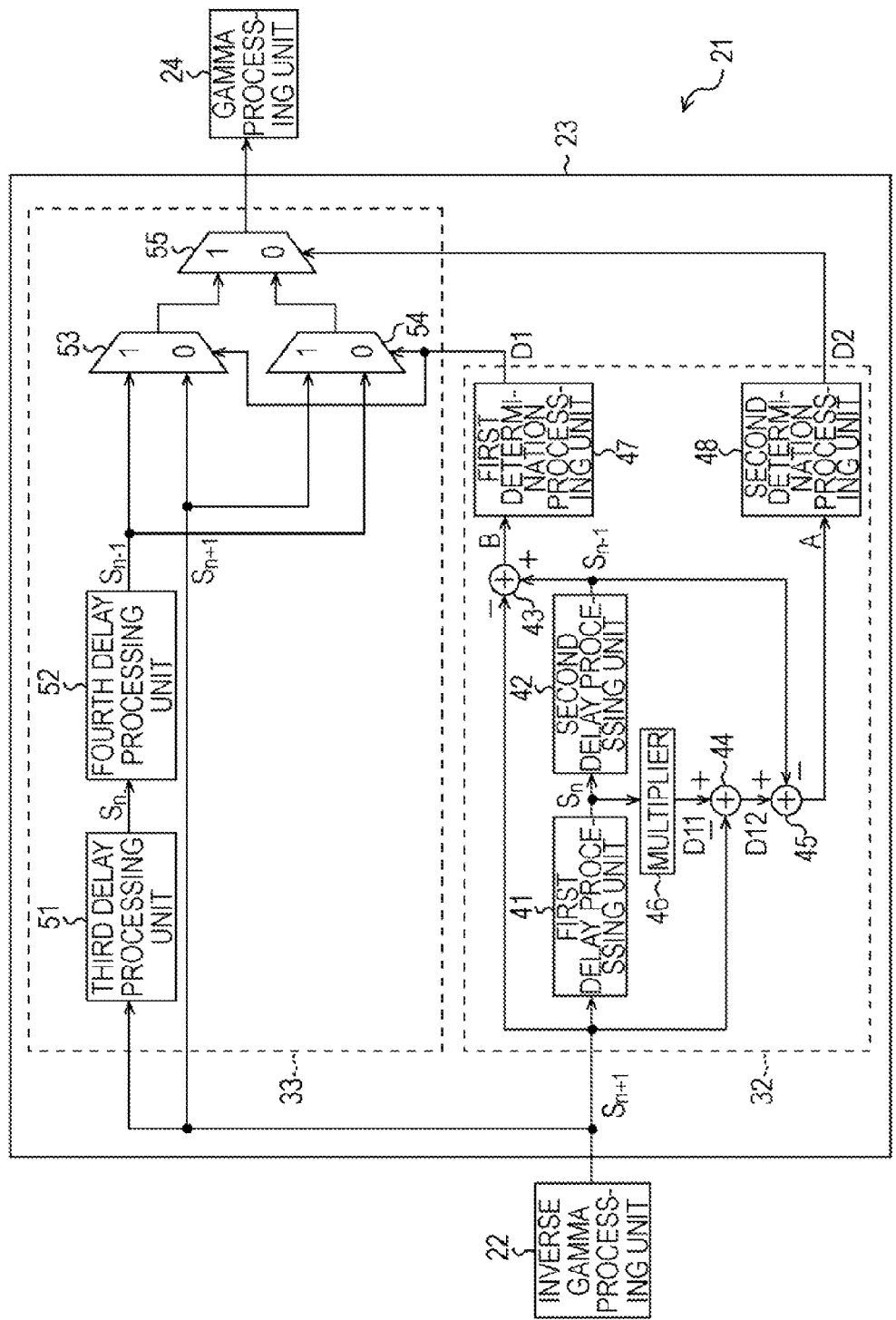
FIG. 6 is a block diagram illustrating a functional configuration of the correction processing unit.

FIG. 6 is a block diagram illustrating a functional configuration of the correction processing unit 23 shown in FIG. 3.

In FIG. 6, the correction processing unit 23 includes a calculation unit 32 and a replacement unit 33.

The correction processing unit 23 receives pixel values of pixels of the image T4, which were subjected to inverse gamma processing and which were supplied from the inverse gamma processing unit 22 on a pixel-by-pixel basis in an order starting from a pixel value of a pixel located on the right side of FIG. 5A, for example. Note that processing in the correction processing unit 23 will be described hereinafter with the assumption that one of the pixel values of the corresponding pixels supplied from the inverse gamma processing unit 22 to the correction processing unit 23 is a pixel value $S_{n+1}$ of the left pixel.

As described with reference to FIG. 5, the calculation unit 32 calculates equation (1) to obtain a quadratic differential value A, and calculates equation (2) to obtain a difference value B. Then, the calculation unit 32 supplies to the replacement unit 33 a control signal D1 indicating whether the difference value B is larger than 0 and a control signal D2 indicating whether the quadratic differential value A is larger than 0.

The calculation unit 32 includes a first delay processing unit 41, a second delay processing unit 42, a first adder 43, a second adder 44, a third adder 45, a multiplier 46, a first determination processing unit 47, and a second determination processing unit 48.

In the calculation unit 32, an output terminal of the inverse gamma processing unit 22 is connected to an input terminal of the first delay processing unit 41, one input terminal of the first adder 43, and one input terminal of the second adder 44. Furthermore, an output terminal of the first delay processing unit 41 is connected to an input terminal of the second delay processing unit 42 and an input terminal of the multiplier 46. Moreover, an output terminal of the second delay processing unit 42 is connected to the other input terminal of the first adder 43 and one input terminal of the third adder 45.

Furthermore, in the calculation unit 32, an output terminal of the multiplier 46 is connected to the other input terminal of the second adder 44, and an output terminal of the second adder 44 is connected to the other input terminal of the third adder 45. An output terminal of the first adder 43 is connected to an input terminal of the determination processing unit 47, and an output terminal of the third adder 45 is connected to an input terminal of the second determination processing unit 48.

The first delay processing unit 41 and the second delay processing unit 42 are used to delay and output pixel values supplied thereto.

For example, the first delay processing unit 41 receives a pixel value $S_{n+1}$ of a left pixel supplied from the inverse gamma processing unit 22 and outputs a pixel value $S_n$ of a pixel of interest. The second delay processing unit 42 receives the pixel value $S_n$ of a pixel of interest supplied from the first delay processing unit 41 and outputs a pixel value $S_{n-1}$ of the right pixel.

The first adder 43 receives the pixel value $S_{n+1}$ of the left pixel supplied from the inverse gamma processing unit 22 and further receives the pixel value $S_{n-1}$ of a right pixel supplied from the second delay processing unit 42. The first adder 43 subtracts the pixel value $S_{n+1}$ of the left pixel supplied from the inverse gamma processing unit 22 from the pixel value $S_{n-1}$ of the right pixel supplied from the second delay processing unit 42, and a value obtained as a result of the subtraction is supplied to the determination processing unit 47. That is, the first adder 43 calculates equation (2) and supplies a difference value 8 obtained as a result of the calculation to the determination processing unit 47.

The multiplier 46 receives the pixel value $S_n$ of the pixel of interest supplied from the first delay processing unit 41. The multiplier 46 multiplies the pixel value $S_n$ of the pixel of interest supplied from the first delay processing unit 41 by a predetermined value of 2, and outputs a value D11 obtained as a result of the multiplication.

The second adder 44 receives the pixel value $S_{n+1}$ of the left pixel supplied from the inverse gamma processing unit 22 and the value D11 supplied from the multiplier 46. The second adder 44 subtracts the pixel value $S_{n+1}$ of the left pixel supplied from the inverse gamma processing unit 22 from the value D11 supplied from the multiplier 46, and supplies a value D12 obtained as a result of the subtraction to the third adder 45.

The third adder 45 receives the pixel value $S_{n-1}$ of the right pixel supplied from the second delay processing unit 42 and further receives the value D12 supplied from the second adder 44. The third adder 45 subtracts the pixel value $S_{n-1}$ of the right pixel supplied from the second delay processing unit 42 from the value D12 supplied from the second adder 44, and supplies a value obtained as a result of the subtraction to the second determination processing unit 48.

That is, the multiplier 46, the second adder 44, the third adder 45 calculate equation (1). The third adder 45 supplies the quadratic differential value A obtained as a result of the calculation of equation (1) to the second determination processing unit 48.

The determination processing unit 47 receives the difference value B obtained as a result of the calculation of equation (2) supplied from the first adder 43. The determination processing unit 47 determines whether the difference value B is larger than 0 and supplies a control signal D1 obtained in accordance with a result of the determination to the replacement unit 33.

When determining that the difference value B is larger than 0, the determination processing unit 47 outputs "1" as the control signal D1 which is to be supplied to the replacement unit 33 and which indicates that the difference value B is larger than 0. On the other hand, when determining that the difference value B is not larger than 0, the determination processing unit 47 outputs "0" as the control signal D1 which is to be supplied to the replacement unit 33 and which indicates that the difference value B is not larger than 0.

The second determination processing unit 48 receives the quadratic differential value A obtained as a result of the calculation of equation (1) supplied from the third adder 45. The second determination processing unit 48 determines whether the quadratic differential value A is larger than 0 and supplies a control signal D2 obtained in accordance with a result of the determination to the replacement unit 33.

When determining that the quadratic differential value A is larger than 0, the second determination processing unit 48 outputs "1" as the control signal D2 which is to be supplied to the replacement unit 33 and which indicates that the quadratic differential value A is larger than 0. On the other hand, when determining that the quadratic differential value A is not larger than 0, the second determination processing unit 48 outputs "0" as the control signal D2 which is to be supplied to the replacement unit 33 and which indicates that the quadratic differential value A is not larger than 0.

The replacement unit 33 replaces the pixel value $S_n$ of the pixel of interest with one of the pixel value $S_{n+1}$ of the left pixel and the pixel value $S_{n-1}$ of the right pixel in accordance with the control signal D1 and the control signal D2 supplied from the calculation unit 32.

The replacement unit 33 includes a third delay processing unit 51, a fourth delay processing unit 52, a first selector 53, a second selector 54, and third selector 55.

In the replacement unit 33, an output terminal of the inverse gamma processing unit 22 is connected to an input terminal of the third delay processing unit 51, one input terminal of the first selector 53, and one input terminal of the second selector 54. Furthermore, an output terminal of the third delay processing unit 51 is connected to an input terminal of the fourth delay processing unit 52. An output terminal of the fourth delay processing unit 52 is connected to the other input terminal of the first selector 53 and the other input terminal of the second selector 54. An output terminal of the first selector 53 is connected to one input terminal of the third selector 55, and an output terminal of the second selector 54 is connected to the other input terminal of the third selector 55.

The third delay processing unit 51 and the fourth delay processing unit 52 delays and outputs pixel values supplied thereto. For example, the third delay processing unit 51 receives the pixel value $S_{n+1}$ of the left pixel supplied from the inverse gamma processing unit 22 and outputs a pixel value $S_n$ of the pixel of interest. The fourth delay processing unit 52 receives the pixel value $S_n$ of the pixel of interest supplied from the third delay processing unit 51 and outputs a pixel value $S_{n-1}$ of the right pixel.

The first selector 53 receives at the one input terminal thereof the pixel value $S_{n+1}$ of the left pixel supplied from the inverse gamma processing unit 22, and the first selector 53 receives at the other input terminal thereof the pixel value $S_{n-1}$ of the right pixel supplied from the fourth delay processing unit 52. Furthermore, the first selector 53 receives the control signal D1 supplied from the determination processing unit 47. The first selector 53 outputs one of the pixel value $S_{n+1}$ of the left pixel supplied from the inverse gamma processing unit 22 and the pixel value $S_{n-1}$ of the right pixel supplied from the fourth delay processing unit 52 in accordance with the control signal D1 supplied from the determination processing unit 47.

For example, when the control signal D1 supplied from the determination processing unit 47 represents "1" indicating that the difference value B obtained as a result of the calculation of equation (2) is larger than 0, the first selector 53 outputs the pixel value $S_{n-1}$ of the right pixel supplied from the fourth delay processing unit 52. On the other hand, when the control signal D1 supplied from the determination processing unit 47 represents "0" indicating that the difference value B obtained as a result of the calculation of equation (2) is not larger than 0, the first selector 53 outputs the pixel value $S_{n+1}$ of the left pixel supplied from the inverse gamma processing unit 22.

Furthermore, the second selector 54 receives at the one input terminal thereof the pixel value $S_{n+1}$ of the left pixel supplied from the inverse gamma processing unit 22, and the second selector 54 receives at the other input terminal the pixel value $S_{n-1}$ of the right pixel supplied from the fourth delay processing unit 52. The second selector 54 further receives the control signal D1 supplied from the determination processing unit 47. Unlike the first selector 53, when the control signal D1 supplied from the determination processing unit 47 represents "1", the second selector 54 outputs the pixel value $S_{n+1}$ of the left pixel supplied from the inverse gamma processing unit 22. On the other hand, when the control signal D1 supplied from the determination processing unit 47 represents "0", the second selector 54 outputs the pixel value $S_{n-1}$ of the right pixel supplied from the fourth delay processing unit 52.

An output of the first selector 53 is supplied to the one input terminal of the third selector 55 whereas an output of the second selector 54 is supplied to the other input terminal of the third selector 55.

That is, when the control signal D1 output from the determination processing unit 47 represents "1", the pixel value $S_{n-1}$ of the right pixel output from the first selector 53 is supplied to the one input terminal of the third selector 55, and the pixel value $S_{n+1}$ of the left pixel output from the second selector 54 is supplied to the other input terminal of the third selector 55. On the other hand, when the control signal D1 output from the determination processing unit 47 represents "0", the third selector 55 receives at the one input terminal thereof the pixel value $S_{n+1}$ of the left pixel supplied from the first selector 53, and the third selector 55 receives at the other input terminal the pixel value $S_{n-1}$ of the right pixel supplied from the second selector 54.

The third selector 55 receives the control signal D2 supplied from the second determination processing unit 48. In accordance with the control signal D2 supplied from the second determination processing unit 48, the third selector 55 outputs a pixel value supplied to one of the two terminals which are the one input terminal connected to the first selector 53 and the other input terminal connected to the second selector 54.

For example, when the control signal D2 supplied from the second determination processing unit 48 represents "1" indicating that the quadratic differential value A obtained as a result of the calculation of equation (1) is larger than 0, the third selector 55 outputs a pixel value input to the one input terminal connected to the first selector 53. On the other hand, the control signal D2 supplied from the second determination processing unit 43 represents "0" indicating that the quadratic differential value A obtained as a result of the calculation of equation (1) is not larger than 0, the third selector 55 outputs a pixel value input to the other input terminal connected to the second selector 54.

That is, in accordance with the control signal D1 output from the determination processing unit 47, the pixel value $S_{n-1}$ of the right pixel or the pixel value $S_{n+1}$ of the left pixel is supplied to one of the input terminals of the third selector 55. Furthermore, in accordance with the control signal D2 output from the second determination processing unit 48, the third selector 55 outputs one of the pixel value $S_{n-1}$ of the right pixel and the pixel value $S_{n+1}$ of the left pixel.

Specifically, when the control signal D1 output from the determination processing unit 47 represents "1" indicating that the difference value B is larger than 0 and the control signal D2 output from the second determination processing unit 48 represents "1" indicating that the quadratic differential value A is larger than 0, the third selector 55 outputs the pixel value $S_{n-1}$ of the right pixel. On the other hand, when the control signal D1 output from the determination processing unit 47 represents "0" indicating that the difference value B is not larger than 0 and the control signal D2 output from the second determination processing unit 48 represents "1" indicating that the quadratic differential value A is larger than 0, the third selector 55 outputs the pixel value $S_{n+1}$ of the left pixel.

When the control signal D1 output from the determination processing unit 47 represents "1" indicating that the difference value B is larger than 0 and the control signal D2 output from the second determination processing unit 48 represents "0" indicating that the quadratic differential value A is not larger than 0, the third selector 55 outputs the pixel value $S_{n+1}$ of the left pixel. When the control signal D1 output from the determination processing unit 47 represents "0" indicating that the difference value B is not larger than 0 and the control signal D2 output from the second determination processing unit 48 represents "0" indicating that the quadratic differential value A is not larger than 0, the third selector 55 outputs the pixel value $S_{n-1}$ of the right pixel.

In the correction processing unit 23, in accordance with the result of the calculations performed in the calculation unit 32, the replacement unit 33 outputs one of the pixel value $S_{n+1}$ of the left pixel or the pixel value $S_{n-1}$ of the right pixel as a pixel value $S_n$ of a pixel of interest.

FIG. 7 is a flowchart illustrating image processing performed by the image processing apparatus 21 shown in FIG. 3 on an image supplied from the gamma processing unit 15 of the camera 11.

In step S11, an image (for example, the image T2 shown in FIG. 4) is supplied from the gamma processing unit 15 of the camera 11 to the inverse gamma processing unit 22 of the image processing apparatus 21, and the image supplied from the gamma processing unit 15 is subjected to inverse gamma processing using the inverse gamma processing unit 22. The gamma processing unit 15 supplies the image (for example, the image T4 shown in FIG. 4) which was subjected to the inverse gamma processing to the correction processing unit 23, and then the process proceeds to step S12.

In step S12, the correction processing unit 23 performs correction processing as described with reference to FIGS. 5A and 5B on the image supplied from the inverse gamma processing unit 22, and the processed image (for example, the image T5 in FIG. 4) is supplied to the gamma processing unit 24.

The process proceeds from step S12 to step S13, the gamma processing unit 24 performs gamma processing on the image supplied from the correction processing unit 23, and the image which was subjected to the gamma processing is supplied to the display unit 13, and here, the image processing is terminated.

As described above, in the image processing apparatus 21, the inverse gamma processing unit 22 performs inverse gamma processing on an image, and further the correction processing unit 23 performs correction processing on the processed image. Accordingly, a center position of an edge portion of the image (for example, the image T5 shown in FIG. 4) which was subjected to the correction processing is not displaced from a center position or an edge portion of an image (for example, the image T1 shown in FIG. 4) captured by the imaging unit 14, and a line representing a pixel value at the edge portion is markedly changed. That is, motion blur in the image is suppressed.

Furthermore, since the edge portion is not displaced, a bright region in the image does not become large. That is, image processing is performed while the bright region in the image is maintained and furthermore the details of the image are maintained. Accordingly, deterioration of a displayed image is avoidable.

Figure 8:
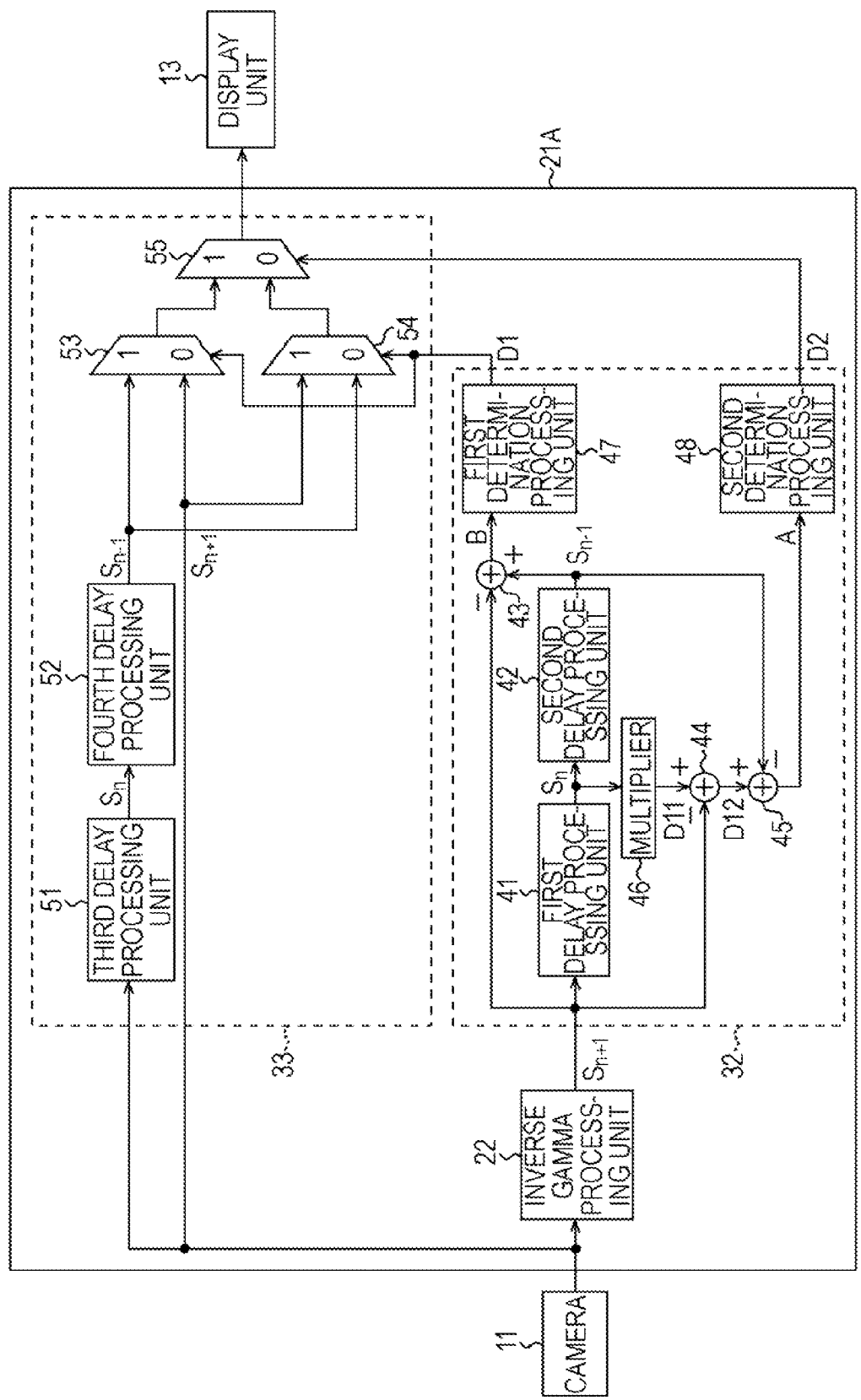
FIG. 8 is a block diagram illustrating a configuration of an image processing apparatus according to a second embodiment of the present invention.

FIG. 8 is a block diagram illustrating a configuration of an image processing apparatus 21A according to a second embodiment of the present invention.

In FIG. 8, the image processing apparatus 21A includes an inverse gamma processing unit 22, a calculation unit 32, and a replacement unit 33. Note that, in FIG. 8, the same reference numerals are used for components corresponding to those used for the image processing apparatus 21 shown in FIG. 6, and therefore, description thereof is omitted.

Specifically, the image processing apparatus 21A shown in FIG. 8 has a similar configuration to the image processing apparatus 21 shown in FIG. 6 in that the image processing apparatus 21A includes the inverse gamma processing unit 22, the calculation unit 32, and the replacement unit 33. However, the image processing apparatus 21A is different from the image processing apparatus 21 shown in FIG. 6 in that, although an image which was subjected to inverse gamma processing using the inverse gamma processing unit 22 is supplied to the calculation unit 32, an image which is output from the camera 11 is directly supplied to the replacement unit 33.

That is, in the image processing apparatus 21A, a pixel value of an image subjected to inverse gamma processing using the inverse gamma processing unit 22 is used only for equations (1) and (2) described above performed using the calculation unit 32.

Furthermore, since an image subjected to gamma processing using the gamma processing unit 15 of the camera 11 is supplied to the replacement unit 33, that is, since an image supplied to the replacement unit 33 has not been subjected to inverse gamma processing, an image output from the replacement unit 33 is directly supplied to the display unit 13.

FIG. 9 is a flowchart illustrating image processing performed on an image supplied from the camera 11 using the image processing apparatus 21A shown in FIG. 8.

In step S21, the gamma processing unit 15 of the camera 11 supplies an image to the inverse gamma processing unit 22 of the image processing apparatus 21A, and the inverse gamma processing unit 22 performs inverse gamma processing on the image supplied from the gamma processing unit 15. Meanwhile, the gamma processing unit 15 supplies an image subjected to inverse gamma processing to the calculation unit 32, and thereafter, the process proceeds to step S22.

In step S22, in the calculation unit 32, equations (1) and (2) are calculated using a pixel value $S_n$ of a pixel of interest, a pixel value $S_{n+1}$ of the left pixel, and a pixel value $S_{n-1}$ of the right pixel, where a predetermined pixel among pixels constituting the image supplied from the inverse gamma processing unit 22 is set as the pixel of interest.

In the calculation unit 32, a determination processing unit 47 supplies control signals D1 indicating whether a quadratic differential value A obtained as a result of the calculation of equation (1) is larger than 0 to a first selector 53 and a second selector 54 of the replacement unit 33. Furthermore, in the calculation unit 32, a second determination processing unit 48 supplies a control signal D2 indicating whether a difference value B obtained as a result of the calculation of equation (2) is larger than 0 to a third selector 55 of the replacement unit 33.

After the processing in step S22, the process proceeds to step S23 where the replacement unit 33 replaces, in accordance with the control signals D1 and the control signal D2, the pixel value $S_n$ of the pixel of interest (that is, a pixel value of the pixel which is included in the image supplied from the camera 11 and which corresponds to the pixel of interest used in the calculation performed using the calculation unit 32) with the pixel value $S_{n+1}$ of the left pixel or the pixel value $S_{n-1}$ of the right pixel (that is, a pixel value of the pixel which is included in the image supplied from the camera 11 and which corresponds to the left pixel or the right pixel used in the calculation performed using the calculation unit 32). The replacement unit 33 supplies the replaced pixel value to the display unit 13.

After the processing in step S23, the process proceeds to step S24 where the calculation unit 32 determines whether all pixels of the image supplied from the inverse gamma processing unit 22 are subjected to the calculation as pixels of interest.

In step S24, when it is determined that all the pixels which are supplied from the inverse gamma processing unit 22 are not subjected to calculation as pixels of interest, the process returns to step S22, and the processes in step S22 onward are repeated. On the other hand, in step S24, when it is determined that all the pixels which are supplied from the inverse gamma processing unit 22 were subjected to calculation as pixels of interest, the image processing is terminated.

As described above, since, in the image processing apparatus 21A, inverse gamma processing is not performed before an image is supplied to the replacement unit 33, processing speed is improved when compared with the image processing apparatus 21 shown in FIG. 6. In addition, image processing may be performed using a memory having a small storage capacity.

Figure 10:
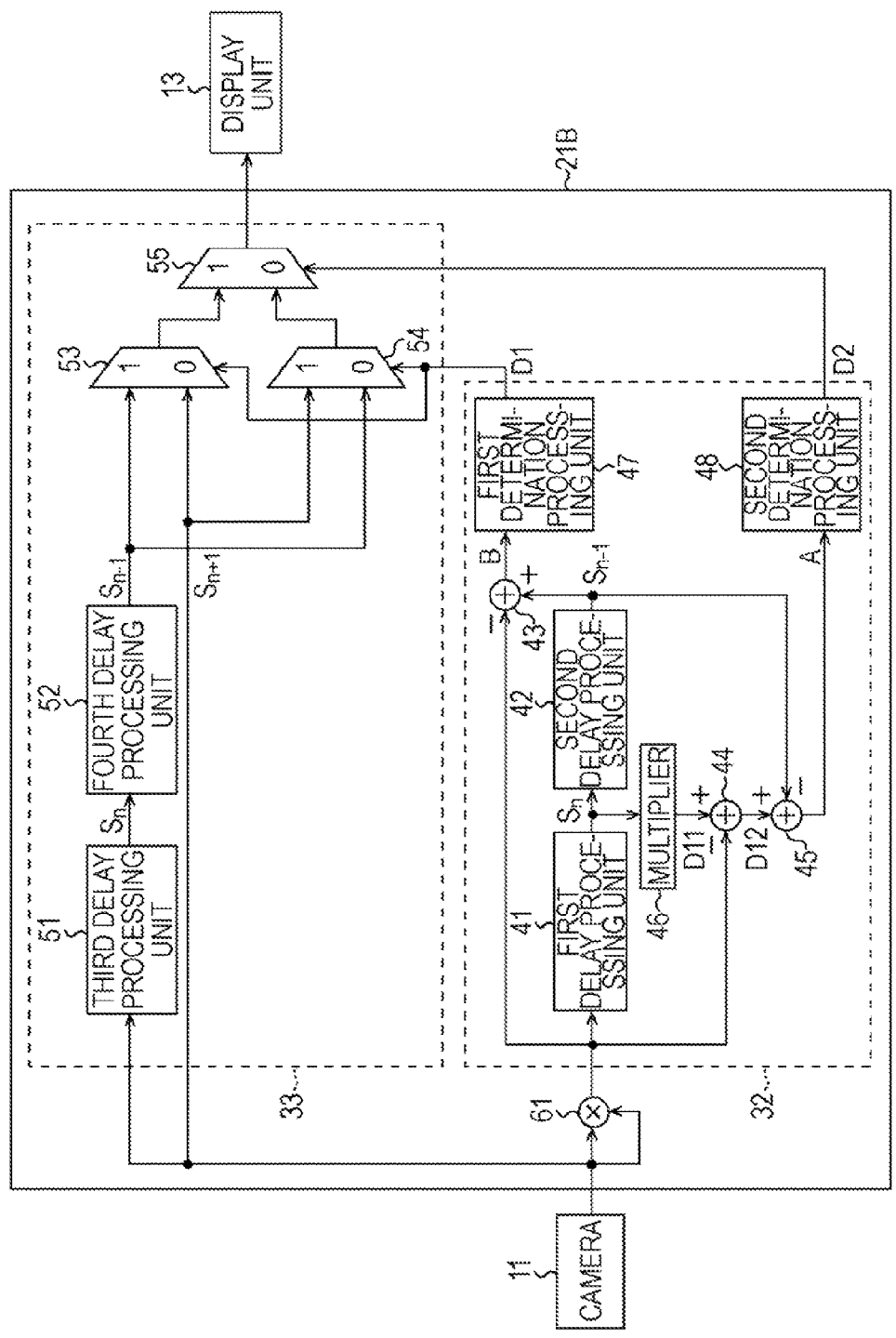
FIG. 10 is a block diagram illustrating a configuration of an image processing apparatus according to a third embodiment of the present invention.

FIG. 10 is a block diagram illustrating a configuration of an image processing apparatus 21B according to a third embodiment of the present invention.

In FIG. 10, the image processing apparatus 21B includes a second multiplier 61, a calculation unit 32, and a replacement unit 33. Note that, in FIG. 10, the same reference numerals are used for components corresponding to those used for the image processing apparatus 21A shown in FIG. 8, and therefore, description thereof is omitted.

Specifically, the image processing apparatus 21B shown in FIG. 10 has a similar configuration to the image processing apparatus 21A shown in FIG. 8 in that the image processing apparatus 21B includes the calculation unit 32 and the replacement unit 33. However, the image processing apparatus 21B is different from the image processing apparatus 21A shown in FIG. 8 in that the image processing apparatus 21B includes the second multiplier 61.

The second multiplier 61 squares a pixel value of an image supplied from the camera 11, and supplies the squared pixel value to the calculation unit 32. Since the pixel value is squared using the second multiplier 61, an approximate value of a pixel value subjected to inverse gamma processing is obtained.

The calculation unit 32 calculates equations (1) and (2) described above using the squared pixel value using the second multiplier 61.

Here, a difference between calculation performed using a pixel value of an image which is subjected to inverse gamma processing using the inverse gamma processing unit 22 shown in FIG. 8 and calculation performed using a squared pixel value using the second multiplier 61 is described.

For example, in a case where a gamma value used in gamma processing to be performed on an image using the gamma processing unit 15 of the camera 11 is set as $\gamma=1/2.2$, the inverse gamma processing unit 22 shown in FIG. 8 performs inverse gamma processing by raising a pixel value of a pixel included in the image supplied from the camera 11 by a power of 2.2. Accordingly, when the calculation unit 32 calculates equation (1) described above using the pixel value raised by a power of 2.2 using the gamma processing unit 15, the calculation unit 32 substantially calculates equation (3).

$$A=2\times S2^{2.2}-S1^{2.2}-S3^{2.2} \quad (3)$$

On the other hand, when the calculation unit 32 calculates equation (1) described above using the squared pixel value using the second multiplier 61, the calculation unit 32 substantially calculates equation (4).

$$A=2\times S2^{2}-S1^{2}-S3^{2} \quad (4)$$

In equations (3) and (4), S1 denotes a pixel value of the right pixel in an image supplied from the camera 11, S2 denotes a pixel value of a pixel of interest in the image supplied from the camera 11, and S3 denotes a pixel value of the left pixel in the image supplied from the camera 11.

For the calculation of equation (3), a memory having a storage capacity larger than that required for the calculation of equation (4) is necessary. Conversely, since the second multiplier 61 is used instead of inverse gamma processing unit 22, in the image processing apparatus 21B, the storage capacity of a memory used for calculation using the calculation unit 32 may be reduced.

The series of processes described above may be executed by hardware or software. When the series of processes are executed by software, a computer including dedicated hardware incorporating programs configuring the software is used or the programs configuring the software are installed from a program recording medium to a general-purpose personal computer capable of executing various functions by installing various programs to be executed.

FIG. 11 is a block diagram illustrating a configuration of a computer which executes the above-described series of processes by executing programs. A CPU (Central Processing Unit) 101 executes various processes in accordance with programs stored in a ROM (Read-Only Memory) 102 or a storage unit 108. A RAH (Random Access Memory) 103 stores as needed programs and data, for example, executed by the CPU 101. The CPU 101, the ROM 102, and the RAM 103 are connected through a bus 104 to one another.

An input/output interface 105 is connected to the CPU 101 through the bus 104. An input unit 106 including a keyboard, a mouse, and a microphone and an output unit 107 including a display unit and a speaker are connected to the input/output interface 105. The CPU 101 executes various processes in response to commands supplied from the input unit 106. Furthermore, the CPU 101 outputs results of the various processes to the output unit 107.

A storage unit 108 connected to the input/output interface 105 is configured by hardware, for example, and stores programs executed by the CPU 101 and a variety of data. A communication unit 109 communicates with an external apparatus through a network such as the Internet and a local area network.

A program may be supplied through the communication unit 109 to be stored in the storage unit 108.

A drive 110 connected to the input/output interface 105 drives a removable medium 111 such as a magnetic disc, an optical disc, a magneto-optical disc, or a semiconductor memory, when it is mounted on the drive 110, in order to obtain programs and data recorded in the removable medium 111. The obtained programs and data are transferred to the storage unit 108 as needed to be stored.

Note that the processing for correcting blur of an image may employ processing other than processing for correcting a pixel value in an edge portion of an image so that the pixel value is markedly changed.

The processes described above with reference to the flowchart are not necessarily processed in a time series in an order described in the flowchart. However, a process executed in parallel or a process individually executed (for example, parallel processing or processing using an object) may be included.

Embodiments of the present invention are not limited to the embodiments described above. It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus that performs image processing on an image supplied from an imaging apparatus that captured an original image and that performed gamma processing on the original image to generate the image to be supplied to the image processing apparatus, the image processing apparatus comprising:
  inverse gamma processing means for performing inverse gamma processing on the image supplied from the imaging apparatus so that the image has characteristics the same as characteristics of the original image, which corresponds to the image before the image was subjected to the gamma processing in the imaging apparatus; and
  correction processing means for performing correction processing on the image subjected to the inverse gamma processing using the inverse gamma processing means so that blur in the image is corrected, wherein the correction processing means replaces a pixel value of a pixel of interest of the image subjected to the inverse gamma processing with a pixel value of one of pixels neighboring the pixel of interest based on a difference between the pixel of interest and the pixels neighboring the pixel of interest.

2. The image processing apparatus according to claim 1, further comprising:
  gamma processing means for performing gamma processing, which is the same as the gamma processing performed in the imaging apparatus, on the image subjected to the correction processing using the correction processing means.

3. The image processing apparatus according to claim 1, wherein the correction processing means performs the correction processing for correcting blur in the image on a luminance signal of the image.

4. The image processing apparatus according to claim 1, wherein the correction processing means performs processing on the image subjected to the inverse gamma processing using the inverse gamma processing means so that a pixel value in an edge portion of the image markedly changes.

5. The image processing apparatus according to claim 1, wherein the correction processing means includes:
  calculating means for performing predetermined calculation using, among pixels constituting the image subjected to the inverse gamma processing using the inverse gamma processing means, a pixel value of a pixel of interest which is an object to be subjected to the correction processing, a pixel value of a pixel spaced away from the pixel of interest in a first direction, and a pixel value of a pixel spaced away from the pixel of interest in a second direction; and
  replacing means for replacing the pixel value of the pixel of interest with any one of the pixel value of the pixel spaced away from the pixel of interest in the first direction and the pixel value of the pixel spaced away from the pixel of interest in the second direction in accordance with a result of the calculation performed using the calculating means.

6. A computer-implemented image processing method for performing image processing on an image supplied from an imaging apparatus that captured an original image and that performed gamma processing on the original image to generate the image to be supplied, the image processing method comprising the steps of:
  performing inverse gamma processing on the image supplied from the imaging apparatus so that the image has characteristics the same as characteristics of the original image, which corresponds to the image before the image was subjected to the gamma processing in the imaging apparatus; and
  performing correction processing on the image subjected to the inverse gamma processing so that blur in the image is corrected, wherein the correction processing includes replacing a pixel value of a pixel of interest of the image subjected to the inverse gamma processing with a pixel value of one of pixels neighboring the pixel of interest based on a difference between the pixel of interest and the pixels neighboring the pixel of interest.

7. A non-transitory computer readable storage medium recording a program executable by a computer that performs image processing on an image supplied from an imaging apparatus that captured an original image and that performed gamma processing on the original image to generate the image to be supplied, the program, when executed, causing the computer to perform a method, the method comprising the steps of:
  performing inverse gamma processing on the image supplied from the imaging apparatus so that the image has characteristics the same as characteristics of the original image, which corresponds to the image before the image was subjected to the gamma processing in the imaging apparatus; and
  performing correction processing on the image subjected to the inverse gamma processing so that blur in the image is corrected, wherein the correction processing includes replacing a pixel value of a pixel of interest of the image subjected to the inverse gamma processing with a pixel value of one of pixels neighboring the pixel of interest based on a difference between the pixel of interest and the pixels neighboring the pixel of interest.

8. An image processing apparatus that performs image processing on an image supplied from an imaging apparatus that captured an original image and that performed gamma processing on the original image to generate the image to be supplied to the image processing apparatus, the image processing apparatus comprising:
  processing means for performing predetermined processing on the image supplied from the imaging apparatus;
  calculating means for performing predetermined calculation using, among pixels constituting the image subjected to the predetermined processing using the processing means, a first pixel value of a pixel of interest which is an object to be subjected to processing, a second pixel value of a pixel spaced away from the pixel of interest in a first direction, and a third pixel value of a pixel spaced away from the pixel of interest in a second direction, wherein the calculating means calculates a difference between the first pixel value and the second pixel value, a difference between the third pixel value and the first pixel value, and a difference between the second pixel value and the third pixel value; and
  replacing means for replacing the pixel value of the pixel, which corresponds to the pixel of interest, supplied from the imaging apparatus with any one of the pixel value of the pixel spaced away from the pixel of interest in the first direction and the pixel value of the pixel spaced away from the pixel of interest in the second direction in accordance with a result of the calculation performed using the calculating means.

9. The image processing apparatus according to claim 8, wherein the processing means performs inverse gamma processing on the image supplied from the imaging apparatus so that the image has characteristics the same as characteristics of the original image, which corresponds to the image before the image was subjected to the gamma processing in the imaging apparatus.

10. The image processing apparatus according to claim 8, wherein the processing means performs processing for squaring a pixel value of a pixel constituting the image supplied from the imaging apparatus.

11. A computer-implemented image processing method for performing image processing on an image supplied from an imaging apparatus that captured an original image and that performed gamma processing on the original image to generate the image to be supplied, the image processing method comprising the steps of:

performing predetermined processing on the image supplied from the imaging apparatus;

performing predetermined calculation using, among pixels constituting the image subjected to the predetermined processing, a first pixel value of a pixel of interest which is an object to be subjected to processing, a second pixel value of a pixel spaced away from the pixel of interest in a first direction, and a third pixel value of a pixel spaced away from the pixel of interest in a second direction to calculate a difference between the first pixel value and the second pixel value, a difference between the third pixel value and the first pixel value, and a difference between the second pixel value and the third pixel value; and replacing the pixel value of the pixel, which corresponds to the pixel of interest, supplied from the imaging apparatus with any one of the pixel value of the pixel spaced away from the pixel of interest in the first direction and the pixel value of the pixel spaced away from the pixel of interest in the second direction in accordance with a result of the calculation.

12. A non-transitory computer readable storage medium recording a program executable by a computer that performs image processing on an image supplied from an imaging apparatus that captured an original image and that performed gamma processing on the original image to generate the image to be supplied, the program, when executed, causing the computer to perform a method, the method comprising the steps of:

performing predetermined processing on the image supplied from the imaging apparatus;

performing predetermined calculation using, among pixels constituting the image subjected to the predetermined processing, a first pixel value of a pixel of interest which is an object to be subjected to processing, a second pixel value of a pixel spaced away from the pixel of interest in a first direction, and a third pixel value of a pixel spaced away from the pixel of interest in a second direction to calculate a difference between the first pixel value and the second pixel value, a difference between the third pixel value and the first pixel value, and a difference between the second pixel value and the third pixel value; and replacing the pixel value of the pixel, which corresponds to the pixel of interest, supplied from the imaging apparatus with any one of the pixel value of the pixel spaced away from the pixel of interest in the first direction and the pixel value of the pixel spaced away from the pixel of interest in the second direction in accordance with a result of the calculation.

13. An image processing apparatus that performs image processing on an image supplied from an imaging apparatus that captured an original image and that performed gamma processing on the original image to generate the image to be supplied to the image processing apparatus, the image processing apparatus comprising:

inverse gamma processor performing inverse gamma processing on the image supplied from the imaging apparatus so that the image has characteristics the same as characteristics of the original image, which corresponds to the image before the image was subjected to the gamma processing in the imaging apparatus; and correction processor performing correction processing on the image subjected to the inverse gamma processing using the inverse gamma processor so that blur in the image is corrected, wherein the correction processor replaces a pixel value of a pixel of interest of the image subjected to the inverse gamma processing with a pixel value of one of pixels neighboring the pixel of interest based on a difference between the pixel of interest and the pixels neighboring the pixel of interest.

14. An image processing apparatus that performs image processing on an image supplied from an imaging apparatus that captured an original image and that performed gamma processing on the original image to generate the image to be supplied to the image processing apparatus, the image processing apparatus comprising:

processor performing predetermined processing on the image supplied from the imaging apparatus;

calculator performing predetermined calculation using, among pixels constituting the image subjected to the predetermined processing using the processor, a first pixel value of a pixel of interest which is an object to be subjected to processing, a second pixel value of a pixel spaced away from the pixel of interest in a first direction, and a third pixel value of a pixel spaced away from the pixel of interest in a second direction, wherein the calculator calculate a difference between the first pixel value and the second pixel value, a difference between the third pixel value and the first pixel value, and a difference between the second pixel value and the third pixel value; and replacement unit replacing the pixel value of the pixel, which corresponds to the pixel of interest, supplied from the imaging apparatus with any one of the pixel value of the pixel spaced away from the pixel of interest in the first direction and the pixel value of the pixel spaced away from the pixel of interest in the second direction in accordance with a result of the calculation performed using the calculator.

* * * * *